US008488760B2

(12) United States Patent
Abramson et al.

(10) Patent No.: US 8,488,760 B2
(45) Date of Patent: Jul. 16, 2013

(54) CALL ROUTING OR ESCALATION BASED ON THE IDENTITY, ROLE OR URGENCY OF THE CALLING OR COMMUNICATING PARTY

(75) Inventors: Sandy Abramson, Freehold, NJ (US); Anthony Frissora, Fair Haven, NJ (US); Raj Sinha, West Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 142 days.

(21) Appl. No.: 12/836,752

(22) Filed: Jul. 15, 2010

(65) Prior Publication Data
US 2011/0044442 A1 Feb. 24, 2011

Related U.S. Application Data

(60) Provisional application No. 61/235,838, filed on Aug. 21, 2009.

(51) Int. Cl.
*H04M 1/56* (2006.01)
*H04M 15/06* (2006.01)

(52) U.S. Cl.
USPC .............. 379/142.01; 379/142.04; 379/142.17

(58) Field of Classification Search
USPC .......... 379/88.08, 88.09, 88.11, 88.12, 88.19, 379/88.2, 88.21, 88.22, 88.23, 88.28, 142.01, 379/142.04, 142.05, 142.17, 373.01, 373.03, 379/376.01; 709/202, 224, 235, 239, 240, 709/242; 707/10, 200

See application file for complete search history.

(56) References Cited

U.S. PATENT DOCUMENTS

| | | | |
|---|---|---|---|
| 5,664,126 A * | 9/1997 | Hirakawa et al. | 715/751 |
| 6,606,381 B1 * | 8/2003 | Wunsch | 379/356.01 |
| 2004/0114735 A1 * | 6/2004 | Arning et al. | 379/93.24 |
| 2005/0018819 A1 * | 1/2005 | Schmidt et al. | 379/88.13 |
| 2007/0047522 A1 | 3/2007 | Jefferson et al. | |
| 2007/0047700 A1 | 3/2007 | Mohler | |
| 2007/0133771 A1 * | 6/2007 | Stifelman et al. | 379/142.01 |
| 2008/0246605 A1 * | 10/2008 | Pfeffer et al. | 340/540 |
| 2008/0253551 A1 * | 10/2008 | Gray et al. | 379/211.01 |
| 2009/0003538 A1 * | 1/2009 | Sharpe et al. | 379/70 |
| 2009/0016506 A1 * | 1/2009 | Brown et al. | 379/112.01 |
| 2009/0296905 A1 * | 12/2009 | Naito | 379/142.04 |
| 2010/0158227 A1 * | 6/2010 | Grandhi et al. | 379/142.17 |
| 2012/0083297 A1 * | 4/2012 | Appelman | 455/466 |

* cited by examiner

*Primary Examiner* — Binh Tieu
(74) *Attorney, Agent, or Firm* — Sheridan Ross P.C.

(57) ABSTRACT

Aspects are directed toward managing, including reorganizing, inbound communications, a communications log, or presentation of a communication to a user, based on one or more of the identity, role and urgency of calling or communicating party, including, for example, forwarding or hybrid priority routing. For example, in an e-mail type of environment, received communications could be re-organized based on one or more of the above, such that higher priority communications are escalated to "the-top-of-the-stack." This similar type of operation can be done in a communications modality independent manner, and extended to, for example, voicemails, caller ID, SMS messages, or in general any communication in any communications modality, where one or more communications are capable of being managed and re-organized. As an optional embodiment, an attribute or characteristic associated with the communication can be modified, such that the user is aware of the ranking associated with that communication.

20 Claims, 3 Drawing Sheets

CALL ROUTING OR ESCALATION BASED ON THE IDENTITY, ROLE OR URGENCY OF THE CALLING OR COMMUNICATING PARTY

RELATED APPLICATION DATA

This application claims the benefit of and priority under 35 U.S.C. §119(e) to U.S. Patent Application No. 61/235,838, filed Aug. 21, 2009, entitled "MOJO," which is incorporated herein by reference in its entirety.

FIELD

An exemplary embodiment is directed toward enhancing communications. Even more particularly, an exemplary embodiment is directed toward prioritizing received communications based on one or more factors.

BACKGROUND

Regardless of the communications modality, telephone calls and most other communications, arrive according to the time they were received, regardless of whether they were real-time communications like voice, or asynchronous in nature like e-mail. For example, in a voice-type of environment, both caller ID information and voicemails are presented to the user based on the order in which the communication was received. In a similar manner, e-mails are displayed in an e-mail client typically chronologically by date and time.

SUMMARY

However, a called, or receiving party, may actually want to receive various communications based on one or more of the identity, role, priority, or other characteristic as described herein below, of the calling or originating party. This can be coupled with improvements in routing and queuing to facilitate more efficient communications.

Accordingly, an exemplary embodiment is directed toward escalation of call or communication presentation or routing based on the identity of the calling party, and their level or degree of separation, based on an overlay of, for example, an organizational chart or other social network structure.

Additional aspects are directed toward escalation of a call or communication presentation or routing based on the role of the calling party, such as the project they are working on, or the like. Even further aspects are directed toward an escalation of a call, or communication presentation, or routing based on a perceived urgency of the party launching the communication.

Even further aspects are directed toward escalation of call or communication presentation or routing based on one or more of content analysis, context analysis, and the type of communication, in a modality independent manner.

In accordance with one exemplary embodiment, some aspects to consider could include the notion of discovery and degrees of separation, role, importance, when not indicated in any way from the sender, or the content of the message.

Another possible consideration is forwarding such priority calls where the escalation or precedence is not extensible because of system boundaries. In yet another exemplary embodiment, a possible variation is the ability to forward with comment, priority communications that the intended recipient cannot handle in real-time. The further variation is the ability to sign a hybrid priority, such as a combination of the sender and the original intended receiver of the message, when presented to a third party. Even another variation is to assign weights to one or more of the above, including a multi-party communication, and then perform a mathematical analysis of the assigned values to determine whether, for example, an escalation of the communication is warranted. This can further be reconciled against one or more rule sets that may be predefined, determined by a user, or based on, for example, artificial intelligence, fuzzy logic, or the like.

Even further aspects are related to an ability to route or escalate a communication session based on one or more of the identity, role and urgency of calling or communicating party, including, for example, forwarding or hybrid priority routing.

Even additional aspects are directed toward managing, including reorganizing, inbound communications, a communications log, or presentation of a communication to a user, based on one or more of the above. For example, in an e-mail type of environment, received communications could be re-organized based on one or more of the above, such that higher priority communications are escalated to "the-top-of-the-stack." This similar type of operation can be done in a communications modality independent manner, and extended to, for example, voicemails, caller ID logs, SMS messages, or in general any communication in any communications modality, where one or more communications are capable of being managed and re-organized based on the above. As an optional embodiment, an attribute or characteristic associated with the communication can be modified, such that the user is aware of the ranking associated with that communication. For example, a numerical ranking could be assigned so that users could see messages with "priority one" assigned to high priority messages, and "priority five" assigned to lower priority messages. This could optionally be coupled with one or more graphical icons that illustrate, for example, the movement of a communication within a communication list either up or down, or no change, based on one or more of the above analyses.

Additional aspects are directed toward a method including receiving, at a communications receiving module, one or more communications, determining one or more of caller identification information and sender information, determining one or more of separation information, role information, urgency information, content and context associated with the one or more communications, and reordering the one or more communications relative to one or more other communications, wherein the one or more other communications may have been previously received.

These and other advantages will be apparent from the disclosure contained herein. The above-described embodiments and configurations are neither complete nor exhaustive. As will be appreciated, other embodiments are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

The exemplary embodiments will be described in detail, with reference to the following figures, wherein.

DETAILED DESCRIPTION

Some embodiments will be illustrated below in conjunction with an exemplary communication system. Although well suited for use with, e.g., a system using switch(es), server(s) and/or database(s), communications endpoints, etc., the embodiments are not limited to use with any particular type of communication system or configuration of system elements. Those skilled in the art will recognize that the disclosed techniques may be used in any communication application in which it is desirable to provide enhanced communications.

Figure 1:
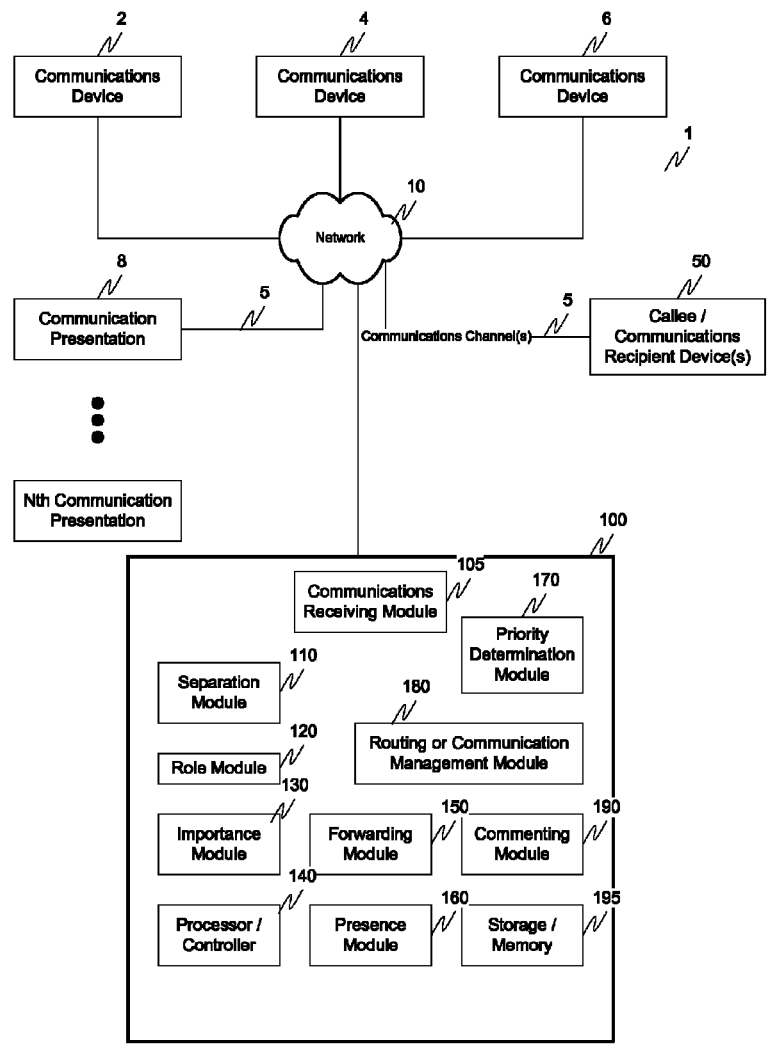
FIG. 1 illustrates an exemplary communications environment.

Referring initially to FIG. 1 an exemplary communication environment 1 will be described in accordance with at least some embodiments. The communication environment comprises (in addition to well-known componentry) a communication network connecting a plurality of communication devices capable of sending one or more communications in one or more modalities.

In one embodiment, communication system may include a switch that may include a private branch exchange (PBX) system or any similar type of switching system capable of providing a telephone service to one or more entities such as an enterprise associated with the switch, a user associated with the switch, such as a caller or callee, or the like. The switch may be one of a number of known exchange systems including, but not limited to, Private Automated Branch Exchange (PABX), Computerized Branch Exchange (CBX), Digital Branch Exchange (DBX), or Integrated Branch Exchange (IBX). The switch may also comprise a switching fabric that provides for the connection of multiple endpoints such as communication devices associated with call participants, servers and databases. The switching fabric can provide the functionality to direct incoming and/or outgoing calls to various endpoints and further provides for conferencing capabilities between endpoints as well as the ability for forward information associated with presence.

Communication devices associated with the participants may be packet-switched or circuit-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and conventional wired or wireless telephones. Additional devices associated with the participants may be computer-based internet browsers and/or applications specific to a particular communications modality, such as an application (and associated communications hardware) that supports micro-blogging from a computer or mobile computing or communications device.

The embodiments will also be discussed in conjunction with an exemplary communication network. Although well suited for use with, e.g., a system having a private branch exchange (PBX) or other similar contact processing switch, the embodiments are not limited to use with any particular type of communication system switch or configuration of system elements. Those skilled in the art will recognize that the disclosed techniques may be used in any communication application in which it is desirable to provide improved communication ranking. The term "contact" or "call" as used herein is intended to include any live voice communications, whether circuit switched or packet switched.

One or more switches may also be included in the communications environment and may include a PBX, an enterprise switch, or other type of telecommunications system switch, as well as other types of processor-based communication control devices such as servers, computers, adjuncts, etc. By way of example, the switch may be implemented as an otherwise conventional DEFINITY™ or MULTIVANTAGE™ Enterprise Communication Service (ECS) or Avaya® Aura Communication Manager™ communication system switch available from Avaya Inc. Other types of known switches are well known in the art and therefore not described in detail herein.

The communication devices 2-6 may be a wired desktop telephone terminals or any other type of terminals capable of communicating with the callee 50. The word "terminal" and "communications device" as used herein should therefore be understood to include not only wired or wireless desktop telephone terminals but also other types of communication devices, including without limitation IP softphones, IP hardphones, mobile telephones, personal computers, laptops, personal digital assistants (PDAs), smart phones, etc.

The switch could also be coupled via one or more links 5 to network 10. In one configuration, the communication lines or links are trunk lines and the network is the public switched telephone network (PSTN). In another configuration, the communication lines pass through an optional gateway to a packet-switched network, such as the Internet. In any event, the lines or links 5 carry incoming contacts to and from the network 10. It should be noted that the embodiments disclosed herein do not require any particular type of information transport and the embodiments may be implemented with any desired type of transport medium as well as combinations of different types of transport media.

FIG. 1 illustrates an exemplary communications environment. The communications environment includes a communications manager 100, linked via one or more networks 10, and links 5 to one or more communications devices (2-6) and callee/communications recipient device(s) 50. Communications manager 100 is also capable of receiving one or more communications, such as communication presentations 8 which can be, for an example, an e-mail, SMS message, text message, multimedia presentation, instant message(s) (IM), social media message(s) such as tweets, or the like. In general, the communications environment 1 allows one or more of the communications devices 2-6 to initiate a communication to the callee/communications recipient device 50 via one or more communications channels 5.

The communication manager 100 includes, in addition to well known componentry, a separation module 110, a role module 120, an importance module 130, a processor/controller 140, a forwarding module 150, a presence module 160, a priority determination module 170, a routing or communication manager module 180, a commenting module 190, and storage/memory 195. The communication manager 100 receives, or otherwise intercepts or monitors one or more communications inbound to the callee/communication recipient device 50, with the cooperation of the communications receiving module 105.

In operation, one or more communications are received from one or more of the communications devices 2-6 and communication presentations 8. The communications receiving module 105, as discussed, one or more of intercepts, monitors, forwards and receives communications for the callee 50 on behalf thereof. These communications can include one or more of a call, multi-party conference call, e-mail, SMS message, text message, multimedia message, or in general any communications in any communications modality that can be received by the callee/communications recipient device 50. As discussed, the callee/communications recipient device 50 can be one or more of a telephone, computer, mobile communication device, smart phone, or in general any communication device that is capable of receiving one or more communications from communication devices 2-6 and communication presentation 8.

Associated with the receiving of a communication, one or more of caller ID information and sender information is obtained for the inbound communication. As one example, caller ID information can be obtained from, for example, one or more of the communications devices 2-6, and in a similar manner, "From:" information extracted from an e-mail, text message, SMS message, multimedia message, or the like from communication presentations 8. Next, and in cooperation with the separation module 110, and one or more of processor 140 and storage 195, a determination is made as to the degree of separation between the party associated with the incoming communication and the callee. This can be based on, for example, a correlation to a look-up table, a comparison to address book information, historical information, a user indication as to the degree of separation, a comparison of, for example, last names, or in general any technique or methodology by which degree of separation can be obtained. This can be extended by further optionally dipping into, for example, an organizational chart, or other social networking structure, that provides an indication as to the potential degree of separation between the parties. With the degree of separation having been determined, a value can be assigned by the separation module 110. For example, with one being the closest degree of separation and ten being the maximum amount of separation.

In addition, or as an alternative, and in cooperation with the role module 120, the role of the party associated with the incoming communication can also be determined. For example, the role can be derived from one or more of title information, project information, relationship to the callee, and can further be assumed by one or more of an analysis of historical information, such as an analysis of previously left voicemails, e-mails or other messages. In a similar manner, and depending on the role, a value can be assigned with again one being the highest and ten being the lowest, and this value assigned to the incoming communication.

In addition, or as an alternative, and in cooperation with the importance module 130, an urgency of the incoming communication can be determined. This urgency can be based on one or more of an identity of the calling party, a content analysis, a context analysis and an indicator provided by the calling party. In addition, the communication can be analyzed to, for example, determine an emotional state of the calling party and, for example, in an in-bound call, an excited tone, elevated voice or yelling could, for example, be equated to a highly important or urgent situation. In a similar manner, one or more of content and context of a text-based communication can be analyzed, with certain words triggering the determination that the communication is urgent.

Additionally, or as an alternative, one or more of the content and context analysis can be performed independently of the urgency or importance assessment, and a value associated therewith optionally also assigned to the inbound communication.

Additionally, or as an alternative, priority can be driven by analyzing the pattern of communications. For example, someone calling a first person repeatedly in the last hour could bump their priority in the simplest form.

Other complex treatments can be someone calling the first person repeatedly when that person is showing busy could also be treated differently.

Additionally, or as an alternative, a determination can be made in cooperation with the communications receiving module 105 whether or not there are multiple parties associated with the inbound communication. Then, as an option, and for one or more of these parties, the above-discussed analysis can be performed with the various weights being assignable to one or more of the parties, or to the communication as whole based on, for example, an average of two or more of the assigned values.

Additionally, or as an alternative, presence information can also be included with the assistance of the presence module 160. This presence information can be associated with any one of the parties involved in the communication and could include presence information obtained from any source, such as via traditional SIP presence techniques.

With the various assessments having been determined and corresponding values assigned, the priority determination module 170 analyzes one or more of the assigned values to determine a priority of the communication. As discussed, this can be based on a simple mathematical analysis of assigned values, an averaging of assigned values, a weighted averaging of one or more of the assigned values, or the like, and in general can include any technique, methodology, or process that allows the priority determination module 170 to rank the incoming communication.

With this rank, a rank value can be assigned to the inbound communication, with this rank value being utilized by the routing or communication management module 180, to prioritize or otherwise order or manage inbound communication for the callee 50. As an example, and as illustrated in relation to FIG. 2, e-mail messages can be re-ordered, or otherwise organized, or an attributed associated therewith changed to reflect this assigned ranking. Similar concepts can be extended to SMS messages, text messages, voicemails, or the like.

Additionally, or as an alternative, the forwarding module 150, cooperating with the commenting module 190, can be utilized to allow a user toad a comment to an inbound communication, with that inbound communication being handled in a special manner based on a determined importance or priority. For example, and in accordance with one optional embodiment, the originator of the communication can be provided feedback as to where their communication is ranked for the callee. If the originator of the communication believes that perhaps their message deserves a higher level of importance, the originator of the communication can optionally append additional information, with the cooperation of the commenting module 190, to their message in an effort to get it ranked higher in the callee communication device 50.

In addition to being able to re-order or modify an attribute associated with an incoming communication, the routing or communication management module 180 can further modify routing of an inbound communication based on the determined importance, urgency, or the like. For example, one or more rule sets, look-up tables, or the like, can be utilized to modify the routing of a communication such that, for example, very urgent communications are routed to more than one destination, and less urgent communications are left in their native format, optionally ordered in the manner they were received. This could be extended across modalities as well with the assistance of a text-to-speech or speech-to-text converter.

Figure 2:
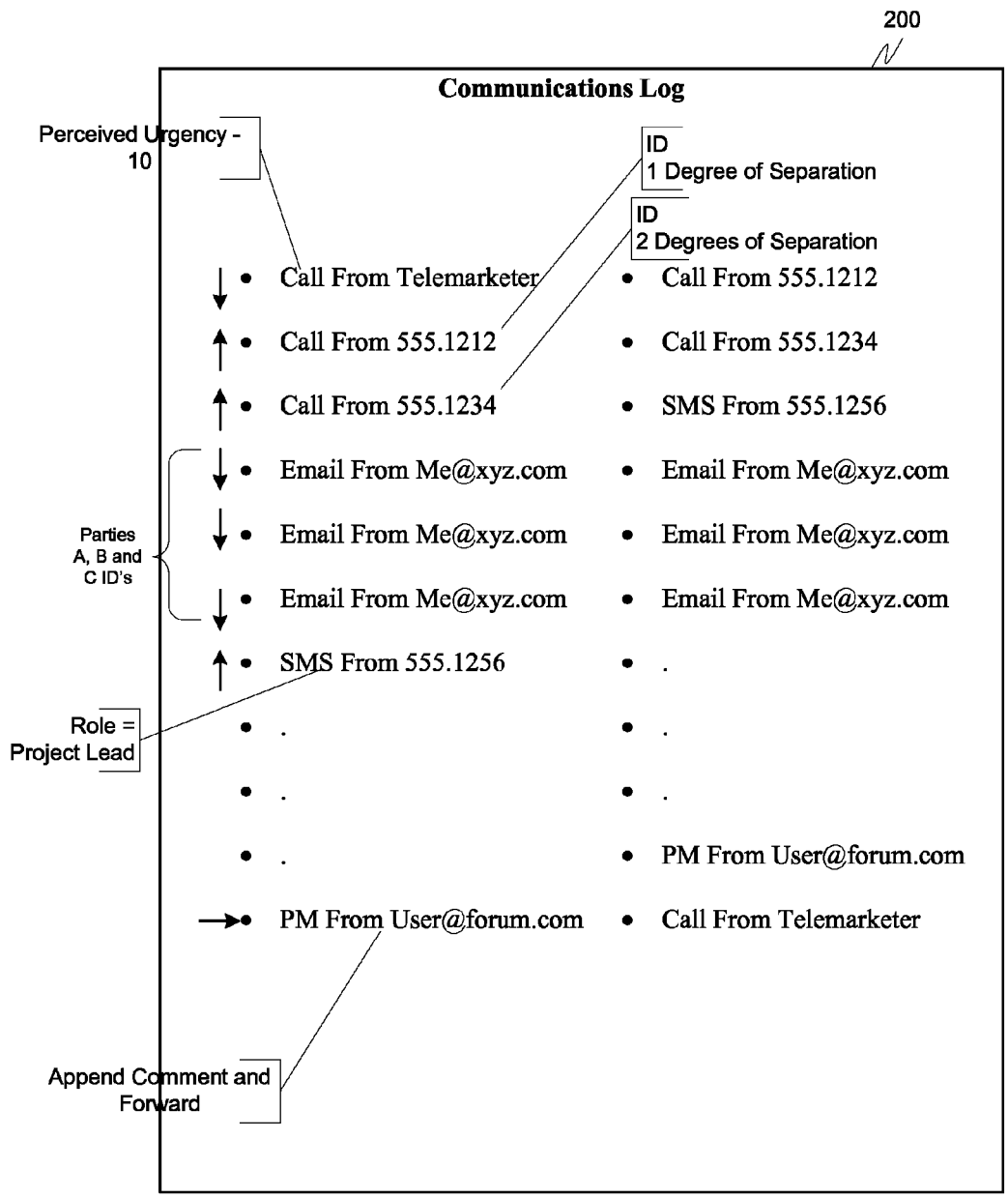
FIG. 2 illustrates an exemplary graphical user interface.

FIG. 2 illustrates an exemplary user interface 200 that could be associated with the callee/communications recipient device 50. For example, if the callee's communication device includes a graphical user interface, this "communications log" could be presented. The interface can provide the callee with visibility into any reorganization of messages as determined by the priority determination module 170 and routing or communications management module 180.

In this exemplary user interface 200, a plurality of communications are shown on the left-hand side in the order in which they were received. On the right-hand side of the user interface 200, a reordered list of the communications is provided based on the analysis of the one or more assigned values. In addition, visibility into how and why the various communications were reordered can be provided, such as, for example, the call from the telemarketer being identified with a perceived urgency of 10 (least important), and a call from 555.1212 have an associated one degree of separation, the call from 555.1234 having an associated two degrees of separation and the SMS from 555.1256 having an associated role of project lead.

There were also three e-mails that had three originating parties (A, B and C), which were evaluated not only from the standpoint of information associated with the originators, but also a degree of separation, and content. Further associated with the list on the left-hand side is a graphical indicator of the direction and movement of the communication, either upward, downward or no change, that was performed by the communication management module 180 after the determination after the determination of the priority by the priority determination module 170.

In accordance with one exemplary embodiment, the user interface 200 is interactive such that a user can rearrange one or more of the inbound communications, with this rearranging being optionally provided as feedback to the priority determination module 170, and optionally a corresponding rule set that allows the callee to further manage how other inbound communications are handled.

The user interface can also include an indication of any call (or in general any communication including, but not limited to, an incoming IM, SMS, voice mail, text, etc. . . . ) forwarding activity that may have occurred as well as any comments that the originator may have associated with the communication.

Figure 3:
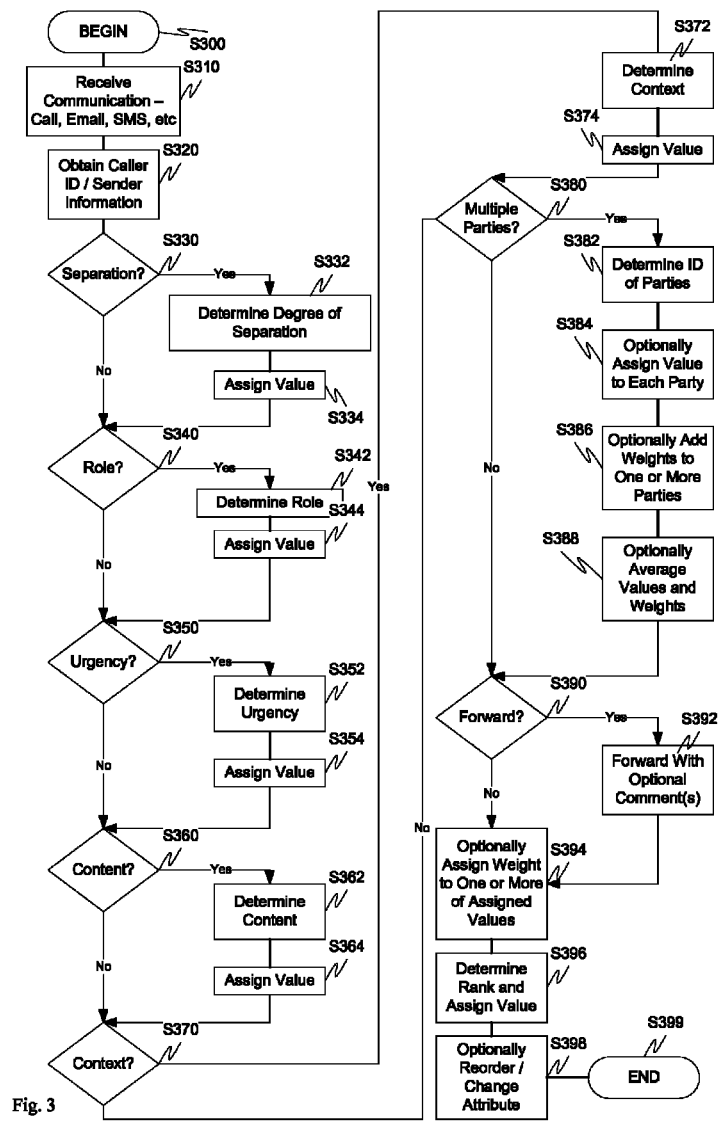
FIG. 3 is a flowchart outlining an exemplary method for prioritizing communications.

FIG. 3 is a flowchart that outlines an exemplary method of operation of the communication manager. In particular, control begins in step S300 and continues to step S310. In step S310, one or more communications are received. Next, in step S320, caller ID and/or sender information are obtained. Then, in step S330, a determination is made as to whether a degree of separation between the calling party or communications originator and the callee is to be made. If a degree of separation is to be determined, control continues to step S332 with control otherwise jumping to step S340.

In step S332, a degree of separation is determined. Next, in step S334, a value associated therewith is assigned to the inbound communication with control continuing to step S340.

In step S340, a determination is made as to whether the role of the party associated with the inbound communication is to be made. If a determination regarding their role is to be made, control continues to step S342 with control otherwise jumping to step S350.

In step S342, the role, or roles, associated with the party associated with the inbound communication are determined, and a value associated therewith is assigned in step S344. Control then continues to step S350.

In step S350 a determination is made as to whether an urgency or importance associated with the inbound communication should be made. If an urgency or importance should be made, control continues to step S352, with control otherwise jumping to step S360.

In step S352, an urgency or importance is determined. Next, in step S354, the value associated therewith is assigned to the inbound communication with control continuing to step S360.

In step S360 a determination is made as to whether content associated with the inbound communication should be analyzed. If content is to be analyzed, control continues to step S362 with control otherwise jumping to step S370.

In step S362, an analysis of the content of the inbound communication is performed. In step S364, a value associated therewith assigned to the inbound communication. Control then continues to step S370.

In step S370, a determination is made as to whether context associated with the inbound communication should be analyzed. If context is to be analyzed, control continues to step S372 with control otherwise jumping to step S380.

In step S372, context associated with the inbound communication is analyzed, with, in step S374, a value based thereon assigned. Control then continues to step S380.

In step S380, a determination is made as to whether multiple parties are associated with the inbound communication. If multiple parties are associated with the inbound communication, control continues to step S382, with control otherwise jumping to step S390.

In step S382, the identities of one or more of the multiple parties can be determined similar to that performed in step S320.

In step S384, a value can optionally be assigned to one or more of the parties, similar to that performed in step S334, step S344, step S354, step S364 and step S374. Then, in step S386, weights can optionally be added for one or more of the above values associated with each of the parties. Then, in step S388, this technique can optionally average two or more of the previously determined values and/or weights associated therewith, with control continuing to step S390.

In step S390, a determination is made as to whether the inbound communication should be forwarded optionally with commenting. If the inbound communication is to be forwarded, control continues to step S392 with control otherwise jumping to step S394.

In step S392, the inbound communication can be forwarded, optionally supplemented with one or more comments in one or more formats, with control continuing to step S394.

In step S394, weights can be assigned to one or more of the assigned values. Next, in step S396, a rank and corresponding assigned value is determined optionally taking into consideration the weights applied in step S394, with each inbound communication then being assigned a rank, relative to the other communications. Control then continues to step S398.

In step S398, one or more of the inbound communications can optionally be reordered, or an attribute associated therewith modified, to reflect the change in their priority. Control then continues to step S399 where the control sequence ends.

The various embodiments include components, methods, processes, systems and/or apparatus substantially as depicted and described herein, including various embodiments, subcombinations, and subsets thereof. Those of skill in the art will understand how to make and use the disclosed techniques after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the embodiments to the form or forms disclosed herein. In the foregoing Detailed Description for example, various features are grouped together in one or more embodiments for the purpose of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as separate preferred embodiments.

Moreover, though the description of the embodiments has included description of one or more features and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While the above-described flowcharts have been discussed in relation to a particular sequence of events, it should be appreciated that changes to this sequence can occur without materially effecting the operation of the system(s). Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols described herein can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques disclosed herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a non-transitory storage medium, executed on a programmed general-purpose computer with the cooperation of a controller and memory, a special purpose computer, a microprocessor, or the like. In these instances, the systems and methods herein can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with exemplary embodiments, systems, apparatuses and methods for enhancing communication efficiency. While the embodiments have been described in conjunction with a number of features, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A method comprising:
receiving, at a communications receiving module, a plurality of communications, wherein the plurality of communications comprise at least two different types of communications;
determining one or more of caller identification information and sender information;
determining one or more of separation information, role information, urgency information, content associated with the plurality of communications, and context associated with the plurality of communications;
reordering the plurality of communications; and
presenting in a graphical user interface the reordered plurality of communications simultaneously with a list of the plurality of communications that has not been reordered.

2. The method of claim 1, further comprising assigning a weight to the one or more of separation information, role information, urgency information, content and context.

3. The method of claim 1, further comprising determining that multiple parties are associated with at least one of the plurality of communications and assigning a weight to one or more of the parties.

4. The method of claim 1, wherein a value associated with one or more of the one or more of separation information, role information, urgency information, content and context is used to determine the reordering.

5. The method of claim 1, further comprising modifying an attribute associated with the plurality of communications.

6. The method of claim 1, wherein a value associated with one or more of the one or more of separation information, role information, urgency information, content and context is used to determine a rank associated with the plurality of communications.

7. The method of claim 1, wherein the plurality of communications include one or more of a phone call, a message, a text message, a multimedia message, an email, a conference call, a voice mail and an electronic message.

8. One or more means for performing the steps of claim 1.

9. A non-transitory computer readable information storage media having stored thereon instructions, that when executed by a processor, perform the steps of claim 1.

10. The method of claim 1, wherein the determined one or more of separation information, role information, urgency information, content and context associated with the plurality of communications comprises at least separation information and the separation information comprises degrees of separation that are used to reorder the plurality of communications, wherein the degrees of separation are one or more degrees of separation between a contactor and a contactee, and wherein the degrees of separation are based on an organizational chart.

11. The method of claim 1, wherein the determined one or more of separation information, role information, urgency information, content and context associated with the plurality of communications comprises at least urgency information and wherein the urgency information is used to reorder the plurality of communications based on two or more of the plurality of communications being received from an individual contactor within a time period that a contactee is busy.

12. The method of claim 1, wherein the determined one or more of separation information, role information, urgency information, content and context associated with the plurality of communications comprises at least urgency information, wherein the urgency information is used to reorder a first one of the plurality of communications based on a hybrid priority of a contactor and an original contactee when the first one of the plurality of communications is presented to a third party.

13. The method of claim 1, further comprising providing feedback to an originator of one of the plurality of communications as to where the one of the plurality of communications is ranked in the reordering of the plurality of communications.

14. A system comprising:
 a communications receiving module that receives a plurality of communications and determines one or more of caller identification information and sender information, wherein the plurality of communications comprise at least two different types of communications;
 one or more modules that determine one or more of separation information, role information, urgency information, content associated with the plurality of communications, and context associated with the plurality of communications;
 a management module that reorders the plurality of communications; and
 a graphical user interface that presents the reordered plurality of communications simultaneously with a list of the plurality of communications that has not been reordered.

15. The system of claim 14, further comprising a priority determination module that assigns a weight to the one or more of separation information, role information, urgency information, content and context.

16. The system of claim 14, wherein multiple parties are associated with at least one of the plurality of communications with a weight assigned to one or more of the parties.

17. The system of claim 14, further comprising a priority determination module that assigns a value to one or more of the one or more of separation information, role information, urgency information, content and context.

18. The system of claim 14, wherein a value associated with one or more of the one or more of separation information, role information, urgency information, content and context is used to determine the reordering.

19. The system of claim 14, wherein an attribute associated with the plurality of communications is modified.

20. The system of claim 14, wherein a value associated with one or more of the one or more of separation information, role information, urgency information, content and context is used to determine a rank associated with the plurality of communications.

* * * * *